United States Patent
Kang et al.

(10) Patent No.: US 7,019,789 B2
(45) Date of Patent: Mar. 28, 2006

(54) APPARATUS AND METHOD FOR CALCULATING COLOR TEMPERATURE

(75) Inventors: Bong soon Kang, Busan (KR); Geun-sik Jang, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 615 days.

(21) Appl. No.: 10/086,246

(22) Filed: Mar. 4, 2002

(65) Prior Publication Data

US 2002/0154136 A1    Oct. 24, 2002

(30) Foreign Application Priority Data

Mar. 10, 2001    (KR) ................. 2001-12431

(51) Int. Cl.
*H04N 9/73*    (2006.01)

(52) U.S. Cl. .................................... 348/655
(58) Field of Classification Search ............ 348/630, 348/655, 645, 649, 182; H04N 9/73
See application file for complete search history.

(56) References Cited

FOREIGN PATENT DOCUMENTS

| JP | 6-165189 A | 6/1994 |
|---|---|---|
| JP | 08-065701 A | 3/1996 |
| JP | 8-322061 | 12/1996 |
| JP | 2000-111983 A | 4/2000 |
| JP | 2000-148978 A | 5/2000 |

*Primary Examiner*—Michael H. Lee
(74) *Attorney, Agent, or Firm*—Sughrue Mion, PLLC

(57) ABSTRACT

An apparatus and a method for use in a color display system, for calculating a color temperature. The apparatus for calculating color temperature includes a color temperature selecting portion for selecting a left color temperature and a right color temperature that are most adjacent to a one-dimensional chroma inputted from a mapping table, the mapping table consisting of chroma and color temperature, a distance calculating portion for calculating distance between the selected left color temperature and the inputted one-dimensional chroma, and between the selected right color temperature and the inputted one-dimensional chroma, respectively, and a color temperature calculating portion for calculating a color temperature corresponding to the one-dimensional chroma inputted in accordance with a ratio of the calculated distance. Accordingly, the apparatus and method can be established using little hardware since the color temperature is calculated at a one-dimensional level.

6 Claims, 5 Drawing Sheets

APPARATUS AND METHOD FOR CALCULATING COLOR TEMPERATURE

BACKGROUND OF THE INVENTION

1. Field of the Invention

The present invention relates to an apparatus and method for calculating a color temperature, and more particularly to an apparatus and method for calculating a color temperature by using one-dimensional chroma coordinate. The present application is based on Korean Patent Application No. 2001-12431 filed Mar. 10, 2001, which is incorporated herein by reference.

2. Description of the Related Art

Color temperature is the temperature of light from a complete heat radiation, which is measured in Kelvin units (K). When one looks at an object, the overall hue perceived by the viewer varies depending on characteristics of the illumination. For example, under an incandescent lamp, an object appears reddish, while in daylight, the same object appears more bluish than under the incandescent lamp. That means, the higher color temperature results in bluish colors, and the lower color temperature results in reddish color. Since the color is closely related to the color temperature, the color temperature needs to be changed in order to change the color.

Color display systems are widely used in many devices for visually transmitting information to the viewer. Such devices include, for example, TVs, DTVs, thin film transistor (TFT) monitors, color printers, digital cameras, projectors, and mobile phones. Due to visual characteristics of the color display system, a correlated color temperature needs to be calculated accurately. The correlated color temperature of a light source which is measured in Kelvin units (K) is the temperature of a blackbody when the color of the light source is the same. In other words, the correlated color temperature is a wavelength of the light source represented by the Kelvin scale, a standard comparison measuring value.

Color models are used to classify colors, and also qualify colors in accordance with attributes like hue, saturation, chroma, lightness, and brightness. Also, the color models are used for matching, and at the same time the valuable resources for the subjects that have to handle color images on the video or the Web. The color models include RGB model, HSB/HSL model, Munsell color system, and CIE color model. The CIE color model is determined by the International Commission on Illumination, the organization for determining lighting standards. The CIE color model includes CIEXYZ, CIELUV, and CIELAB color models. The CIEXYZ color model uses positive tristimulus values, indicated as XYZ to express colors. The CIEXYZ color model uses a chromaticity diagram.

Conventionally, the color temperature is calculated by a two-dimensional color temperature calculating method that uses X and Y axes of the CIEXYZ color model.

Now, the conventional method for calculating the color temperature will be described below with reference to FIGS. 1 and 2.

The description of the conventional method for calculating color temperature is based on "Color Science: Concepts and methods, quantitative data and formula, 2nd edition, pp.225–229 & p.828, 1982" by Gunter Wyszeck and W. S. Stiles. According to the conventional method for calculating color temperature, the color temperature of the light source is obtained by selecting an isotemperature line most adjacent to two-dimensional chroma coordinates corresponding to the light source. The isotemperature line is the line representing values of color temperature with respect to the selected light source. Accordingly, the two-dimensional chroma coordinates of the CIE 1931 diagram calculated from the RGB chroma coordinates of the input image, in other words, the XY chroma coordinates $(X_s, Y_s)$ are inputted (step S110).

Then the XY chroma coordinates $(X_s, Y_s)$ are converted into the two-dimensional chroma coordinates (hereinafter called UV chroma coordinates) $(U_s, V_s)$ of the CIE 1960 UCS diagram (step S120). The UV chroma coordinates $(U_s, V_s)$ are calculated by the following mathematical expression 1:

$$U_s = \frac{4X_s}{-2X_s + 12Y_s + 3}, V_s = \frac{6Y_s}{-2X_s + 12Y_s + 3} \quad \text{[Expression 1]}$$

After the UV chroma coordinates values $(U_s, V_s)$ are calculated from the UV chroma coordinates of the CIE 1960 UCS diagram, two isotemperature lines that are most adjacent to the UV chroma coordinates $(U_s, V_s)$ are selected (step S130).

Next, distances $(d_i, d_{i+1})$ between the selected the UV chroma coordinates $(U_s, V_s)$ and the two isotemperature lines are obtained (step S140). The distance $d_1$ is calculated by the following mathematical expression 2:

$$d_i = \frac{(V_s - V_i) - t_i(U_s - U_i)}{(1 + t_i^2)^{1/2}} \quad \text{[Expression 2]}$$

where, the values $U_s$ and $V_s$ are UV chroma coordinates with respect to the inputted image.

The values $U_i$ and $V_i$ are UV chroma coordinates on the (i)th isotemperature line that has a slopping degree of $t_i$.

As shown in FIG. 2, if the distance ratio $d_i/d_{j+1}$, calculated by the expression 2, is negative, the inputted chroma coordinates $(U_s, V_s)$ lie between the two isotemperature lines of i=j and i=j+1.

Next, from the two distance values $(d_j, d_{j+1})$ calculated in S140, a correlated color temperature $T_c$ is calculated (step S150). The correlated color temperature, corresponding to the inputted UV chroma coordinates $(U_s, V_s)$ can be obtained by two assumptions. One assumption is that a Planckian Locus (PL) between the two selected color temperatures $T_j, T_{j+1}$ can be replaced by a circular arc having a center at an intersection of the two selected isotemperature lines A and B. The other assumption is that the correlated color temperature is a linear function of distance along the circular arc. As a result, the following mathematical expression is obtained:

$$T_c = \left[\frac{1}{T_j} + \frac{\theta_1}{\theta_1 - \theta_2}\left(\frac{1}{T_{j+1}} - \frac{1}{T_j}\right)\right]^{-1} \quad \text{[Expression 3]}$$

where, $\theta_1$ and $\theta_2$ are angles between the correlated isotemperature lines meeting with the intersection of the isotemperature lines A and B, after passing through the two isotemperature lines $T_j, T_{j+1}$ and the UV coordinates $(U_s, V_s)$. With respect to the adjacent isotemperature line having small angles $\theta_1$ and $\theta_2$, with the expressions $\theta_1/\theta_2 = \sin\theta_1/\sin\theta_2$, a fourth mathematical expression is obtained as follows:

$$T_c = \left[\frac{1}{T_j} + \frac{d_j}{d_j - d_{j+1}}\left(\frac{1}{T_{j+1}} - \frac{1}{T_j}\right)\right]^{-1}$$ [Expression 4]

As described above, the conventional method for calculating the two-dimensional color temperature is complicated, and also requires a two-dimensional calculator using the UV chroma coordinates to build hardware. Taking the accuracy of the correlated color temperature $T_c$ into account during the establishment of the hardware, a square root calculator is also required to calculate the distance $d_j$. In addition, a comparator, a multiplier, and a divider, etc. are also required to determine a range of the input value. As a result, establishing the conventional method for detecting the two-dimensional color temperature at a hardware level has considerably low practicality and low utilization in terms of size and costs.

SUMMARY OF THE INVENTION

The present invention has been made to overcome the above-mentioned problems of the related art, and accordingly, it is an object of the resent invention to provide an apparatus and method for calculating a color temperature easily.

The above object is accomplished by an apparatus for calculating a color temperature in accordance with a preferred embodiment of the present invention, including a color temperature selecting portion for selecting a left color temperature and a right color temperature that are most adjacent to a one-dimensional chroma inputted from a mapping table, the table mapping a chroma to a color temperature, a distance calculating portion for calculating distances between the selected left color temperature and the inputted one-dimensional chroma, and between the selected right color temperature and the inputted one-dimensional chroma, respectively, and a color temperature calculating portion for calculating a color temperature corresponding to the one-dimensional chroma inputted in accordance with a ratio of the calculated distances.

It is preferable that the one-dimensional chroma is X coordinates of CIE XYZ coordinates.

The above object is also accomplished by an apparatus for calculating a color temperature in accordance with another preferred embodiment of the present invention, including a chroma selecting portion for selecting a left and a right chroma that are most adjacent to a one-dimensional chroma inputted from a mapping table, the table mapping a chroma to a color temperature, a distance calculating portion for calculating distances between the selected left chroma and the inputted one-dimensional chroma, and between the right chroma and the inputted one-dimensional chroma, respectively, and a color temperature calculating portion for calculating a color temperature corresponding to the one-dimensional chroma inputted in accordance with a ratio of the calculated distances.

The above object is also accomplished by a color display system in accordance with the present invention, including a table mapping a chroma to a color temperature, a chroma detecting portion for detecting the chroma from inputted image data and outputting the detected chroma at a one-dimensional level, a color temperature selecting portion for selecting from the table left and right color temperature/ chroma that are most adjacent to the one-dimensional chroma, a distance calculating portion for calculating distances between the selected left color temperature/chroma and the one-dimensional chroma, and between the right color temperature/chroma and the one-dimensional chroma, a color temperature calculating portion for calculating a color temperature corresponding to the one-dimensional chroma in accordance with a ratio of the calculated distances, a color temperature converting portion for converting the chroma of the inputted image data into the calculated color temperature, and a display portion for displaying an image having the converted color temperature.

The above object is also accomplished by a method for calculating a color temperature in accordance with the present invention including the steps of inputting one-dimensional chroma, selecting left and right color temperatures that are most adjacent to the one-dimensional chroma inputted from a chroma-color temperature mapping table, calculating distances between the selected left color temperature and the inputted one-dimensional chroma, and between the right color temperature and the inputted one-dimensional chroma, and calculating a color temperature corresponding to the one-dimensional chroma inputted in accordance with a ratio of the calculated distances.

The step of calculating the color temperature further includes the sub-steps of calculating a rate-of-change of the color temperature from the left and right color temperature selected in accordance with the ratio of the calculated distances to the inputted one-dimensional chroma, and calculating a final output color temperature corresponding to the inputted one-dimensional chroma by adding/subtracting the calculated rate-of-changes of the temperature to/from the selected left and right color temperature.

BRIEF DESCRIPTION OF THE DRAWINGS

The above-mentioned objects and features of the present invention will be more apparent by describing the preferred embodiment of the present invention in detail referring to the appended drawings, in which.

DETAILED DESCRIPTION OF PREFERRED EMBODIMENT

Figure 1:
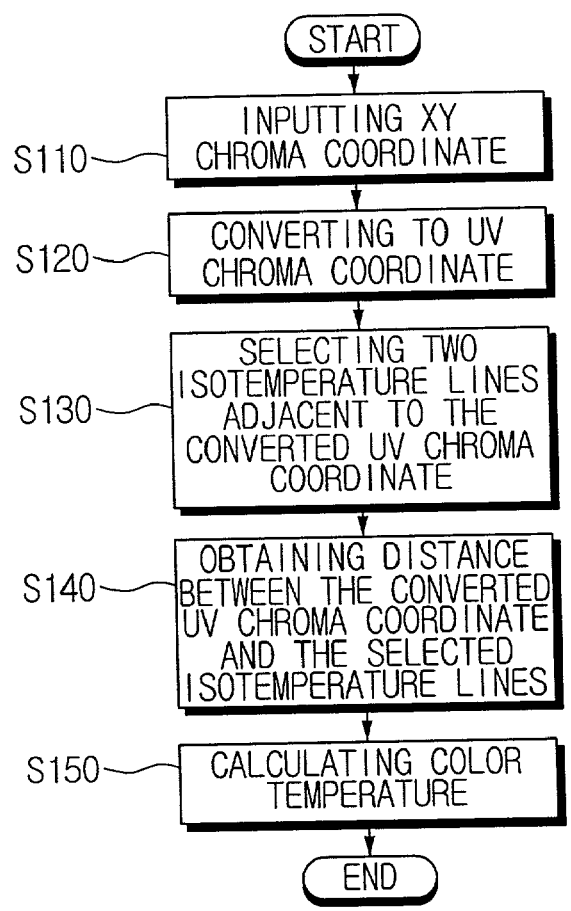
FIG. 1 is a flowchart for explaining a conventional method for calculating a color temperature.
Figure 2:
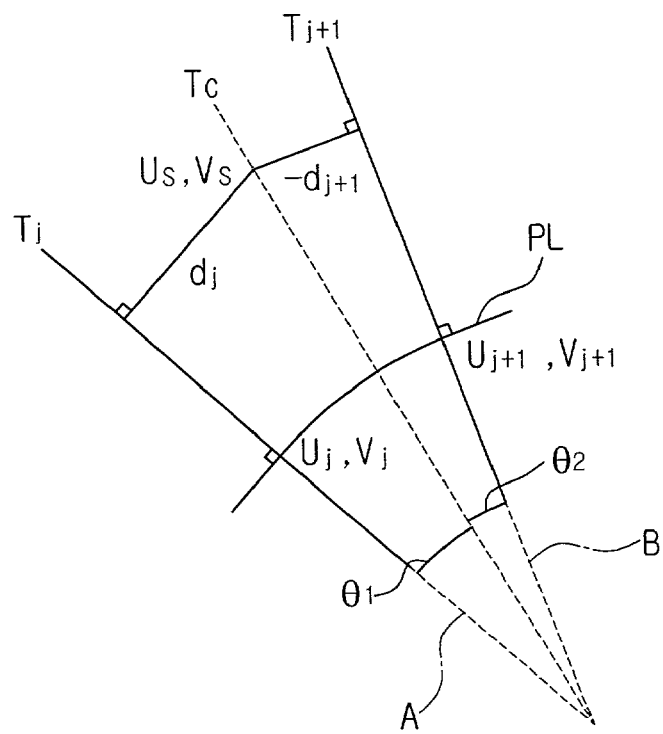
FIG. 2 is a view showing the color temperature calculating method of FIG. 1.

Detailed description according to the preferred embodiment of the present invention will follow referring to the attached drawings, while the like elements are given the same reference numerals throughout.

Figure 3:
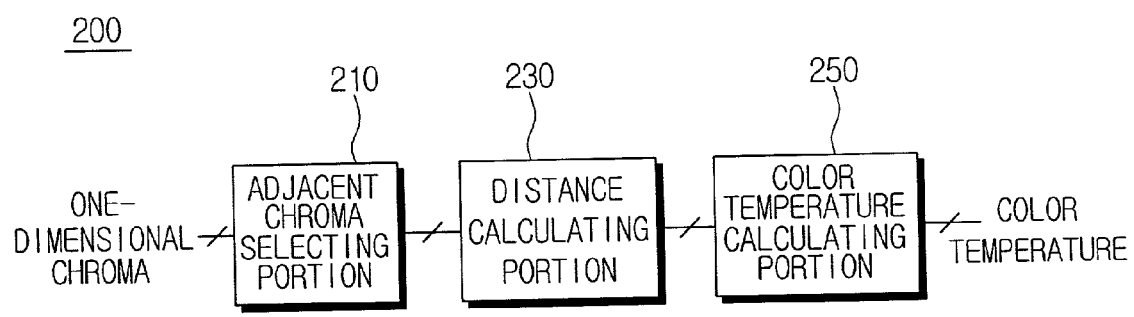
FIG. 3 is a block diagram showing an apparatus for calculating a color temperature in accordance with the present invention.

First, an apparatus 200 for calculating a color temperature in accordance with the preferred embodiment of the present invention will be described with reference to FIG. 3.

The color temperature calculating apparatus 200 in accordance with the preferred embodiment of the present invention includes an adjacent chroma selecting portion 210, a distance calculating portion 230, and a color temperature calculating portion 250.

The adjacent chroma selecting portion 210 selects right and left color temperatures that are most adjacent to a one-dimensional chroma inputted from a table that has a mapping of chroma and color temperatures. The distance calculating portion 230 calculates differences (hereinafter called 'distance' for convenience of explanation) between the right and left color temperatures selected by the adjacent chroma selecting portion 210, and the inputted one-dimensional chroma, respectively. The color temperature calculating portion 250 calculates a color temperature corresponding to the one-dimensional chroma inputted in accordance with a ratio of the calculated distances.

Next, one example of the color temperature calculating apparatus 200 in accordance with the preferred embodiment of the present invention will be described with reference to FIG. 4.

Figure 6:
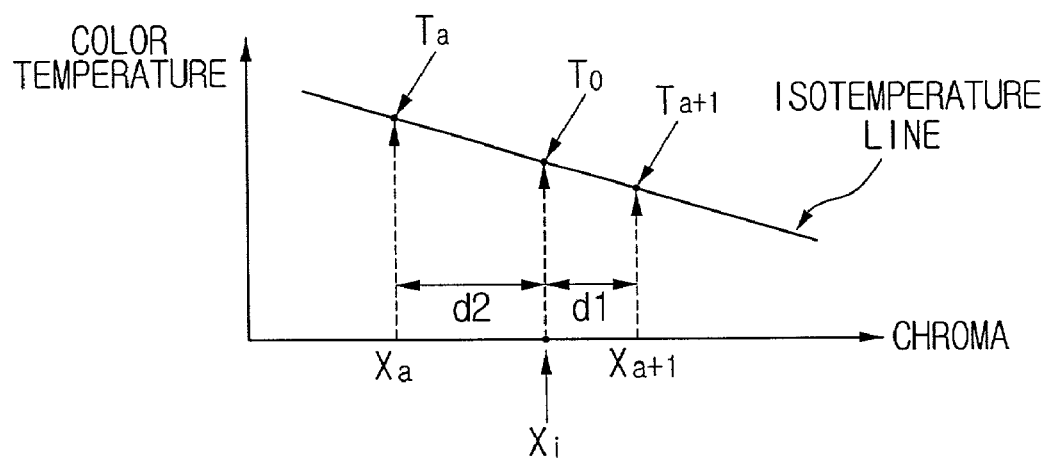
FIG. 6 is a graph for explaining the method for calculating the color temperature of FIG. 5.

The adjacent chroma selecting portion 210 includes a chroma correlated table 210a, a mapping of chroma and color temperature. The denser the relation between the chroma and color temperature of the chroma correlated table 210a, the more accurate calculation of the color temperature becomes possible. The adjacent chroma selecting portion 210 selects a left chroma $X_a$ and a right chroma $X_{a+1}$, which are most adjacent to the one-dimensional chroma value inputted from the chroma correlated table 210a. When the left and right chroma $X_a$ and $X_{a+1}$ are selected, as shown in FIG. 6, a left color temperature $T_a$ and a right color temperature $T_{a+1}$ respectively corresponding to the left and right chroma $X_a$ and $X_{a+1}$ are decided from the chroma correlated table 210a.

The distance calculating portion 230 calculates a distance d2 between the selected left chroma $X_a$ and the inputted chroma $X_i$, and also a distance d1 between the selected right chroma $X_{a+1}$ and the inputted chroma $X_i$, respectively, by the following mathematical expression 5:

$$d1 = x_{a+1} - x_i,$$

$$d2 = x_i - x_a \qquad \text{[Expression 5]}$$

Further, the distance calculating portion 230 calculates a ratio of distance (R1 or R2) by the mathematical expression 6 below.

Figure 4:
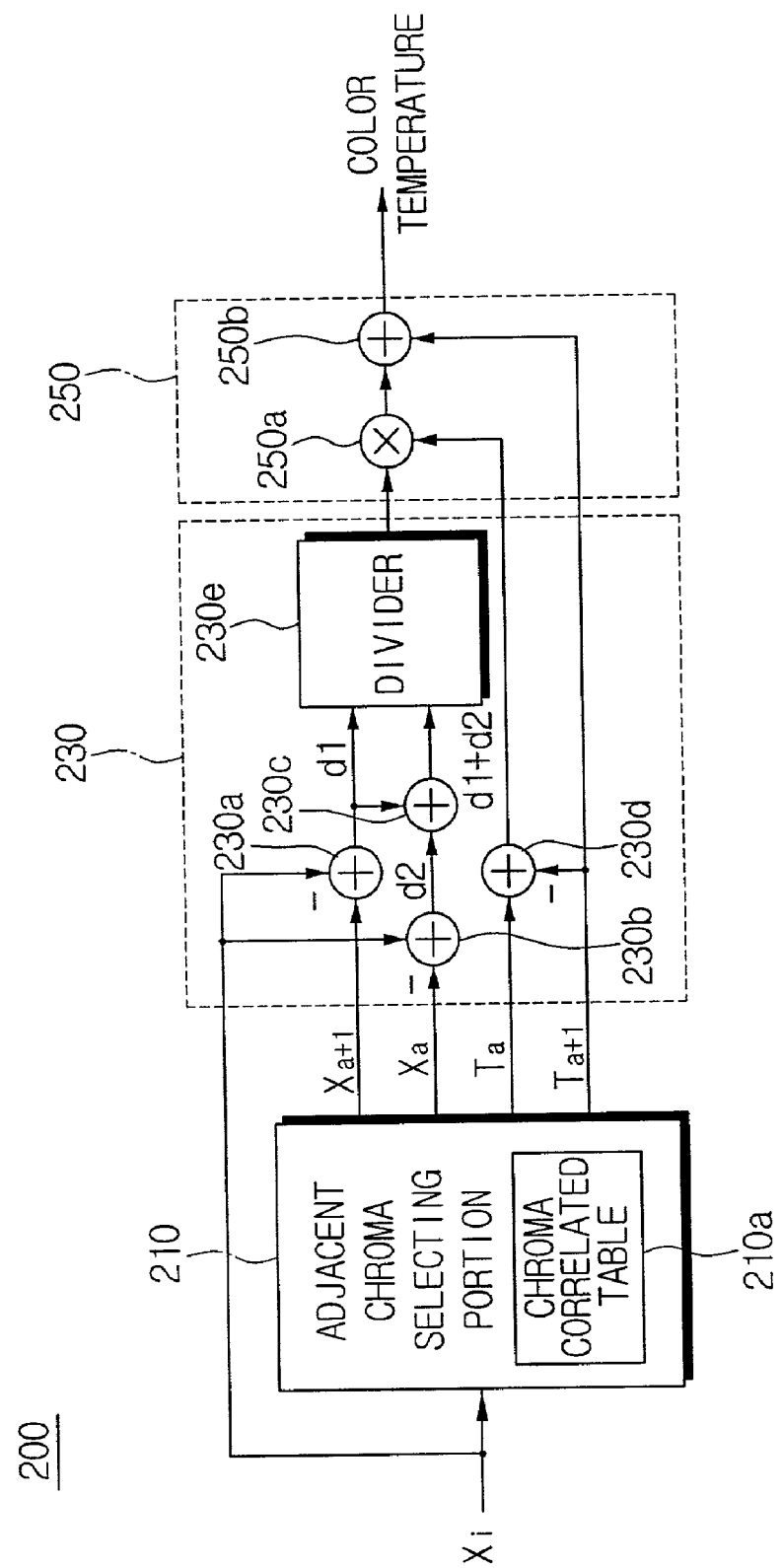
FIG. 4 is a detailed block diagram of FIG. 3.

Although this embodiment uses the distance d1 between the right chroma $X_{a+1}$ and the inputted chroma $X_i$ for obtaining the ratio of distance as shown in FIG. 4, alternatively, the distance d2 between the left chroma $X_a$ and the inputted chroma $X_i$ can also be used. Further, although three adders 230a, 230b, and 230c with one divider 230e are used to obtain the ratio of distance R1 in this embodiment as an example, various modifications are also possible.

$$R1 = \frac{d1}{d1+d2} \text{ or,} \qquad \text{[Expression 6]}$$

$$R2 = \frac{d2}{d1+d2}$$

Further, the distance calculating portion 230 calculates a rate-of-change (ΔT) of the left color temperature $T_a$ and of the right color temperature $T_{a+1}$ by the mathematical expression 7 below.

$$\Delta T = T_a - T_{a+1} \qquad \text{[Expression 7]}$$

The color temperature calculating portion 250 calculates a color temperature $T_o$ corresponding to the inputted chroma $X_i$, by using the ratio of distance R1 and rate-of-change of color temperature ΔT calculated by the distance calculating portion 230.

In this embodiment, the color temperature calculating portion 250 includes one multiplier 250a and one adder 250b, while any proper variation is also possible.

$$T_o = T_{a+1} + \Delta T \times R1 \qquad \text{[Expression 8]}$$

or, $$T_o = T_a - \Delta T \times R2$$

Slightly different from the first preferred embodiment, the color temperature can also be obtained by using the relation shown in FIG. 6, i.e., by selecting left and right color temperatures that are most adjacent to the inputted one-dimensional chroma $X_i$ from the chroma correlated table 210a.

Figure 5:
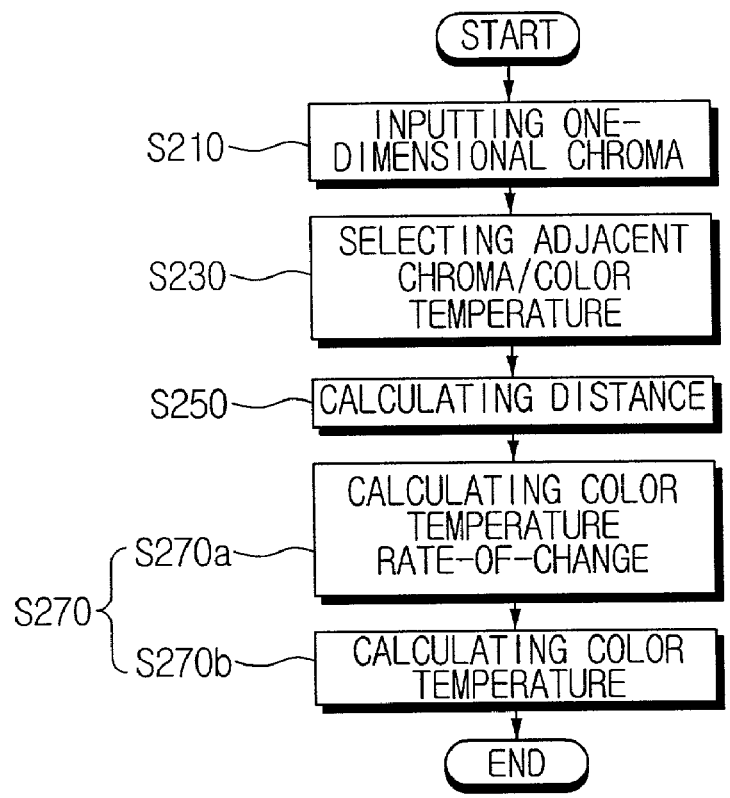
FIG. 5 is a flowchart for explaining a method for calculating a color temperature in accordance with the present invention.

The method for calculating the color temperature in accordance with the present invention will be described below with reference to FIGS. 5 and 6.

The color temperature calculating method includes a one-dimensional chroma inputting step (S210), an adjacent color temperature selecting step (S230), a distance calculating step (S250), and a color temperature calculating step (S270).

In the one-dimensional chroma inputting step (S210), a one-dimensional chroma $X_i$ of an image inputted to the color temperature calculating apparatus is inputted. The adjacent color temperature selecting step (S230) selects left and right color temperatures that are most adjacent to the inputted chroma $X_i$ from the chroma correlated table 210a. When the left and right chroma $X_a$ and $X_{a+1}$ are selected, a left color temperature $T_a$ and a right color temperature $T_{a+1}$ respectively corresponding to the left and right chroma $X_a$ and $X_{a+1}$ are decided from the chroma correlated table 210a.

Although the color temperatures adjacent to the inputted one-dimensional chroma are selected in this embodiment, the adjacent chroma can also be selected instead.

The distance calculating step (S250) calculates a distance d2 between the selected left chroma $X_a$ and the inputted chroma $X_i$, and also a distance d1 between the right chroma $X_{a+1}$ and the inputted chroma $X_i$, respectively. In S250, the ratio of distances R1 or R2 is calculated with the calculated distances d1, d2.

The color temperature calculating step (S270) calculates a color temperature $T_o$ corresponding to the calculated distances d1, d2, and selected initial and end color temperatures $T_a$, $T_{a+1}$. The color temperature calculating step (S270) includes the color temperature rate-of-change calculating sub-step (S270a), and the output color temperature calculating sub-step (S270b).

The color temperature rate-of-change calculating sub-step (S270a) calculates a rate-of-change of color temperature (ΔT) from the left and right color temperatures $T_a$, $T_{a+1}$ as decided. The output color temperature calculating sub-step (S270b) obtains a color temperature $T_o$ corresponding to the input chroma $X_i$, from the ratio of distances R1 or R2 and the rate-of-change of color temperature (ΔT). That is, by adding/subtracting the rate-of-change of color temperature (ΔT) to or from the left color temperature $T_a$ or from the right color temperature $T_{a+1}$, the final output color temperature $T_o$ corresponding to the inputted chroma $X_i$ is calculated.

Figure 7:
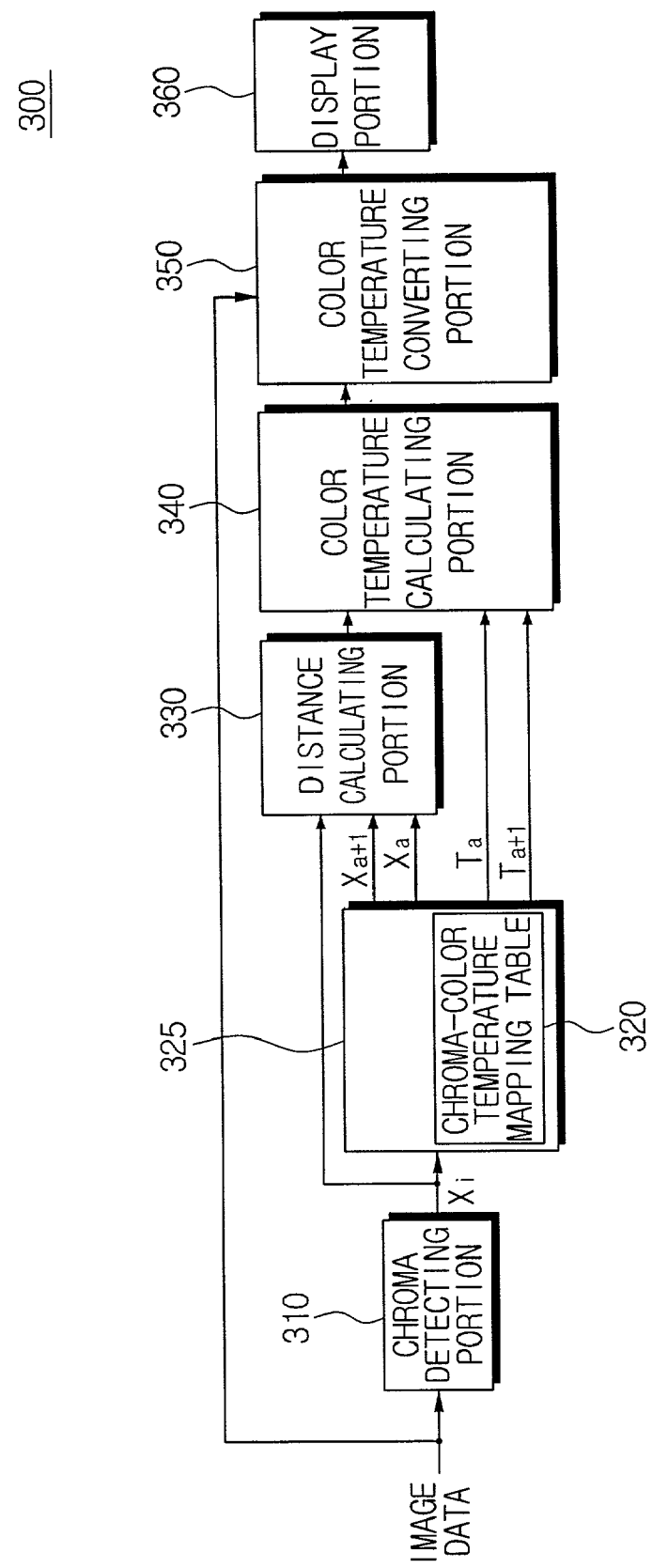
FIG. 7 is a block diagram showing the structure of a color display system having the color temperature calculating apparatus in accordance with the present invention.

Next, a color display system 300 having the color temperature calculating apparatus 200 in accordance with the present invention will be described with reference to FIG. 7.

The color display system 300 includes a chroma detecting portion 310, a chroma-color temperature mapping table 320, an adjacent chroma selecting portion 325, a distance calculating portion 330, a color temperature calculating portion 340, a color temperature converting portion 350, and a display portion 360.

The chroma detecting portion 310 converts RGB chroma coordinates of the input image data into CIE XYZ coordinates, and detects one-dimensional chroma $X_i$ from the inputted image data. If the inputted image data is represented in the CIE XYZ coordinates, only the one-dimensional chroma is detected.

The adjacent chroma selecting portion 325 selects left and right chroma $X_a$, $X_{a+1}$ that are most adjacent to the chroma $X_i$ detected from the chroma-color temperature mapping table 320.

The distance calculating portion 330 calculates distances d1, d2 between the selected left chroma $X_a$ and the detected chroma $X_i$, and between the selected right chroma $X_{a+1}$ and the detected chroma $X_i$, respectively. Further, the distance calculating portion 330 calculates a ratio of distances R1 or R2. The distance calculating portion 330 calculates a rate-of-change $\Delta T$ of the left color temperature $T_a$ and the right color temperature $T_{a+1}$.

The color temperature calculating portion 340 calculates a color temperature $T_o$ corresponding to the chroma $X_i$ that is detected in accordance with the ratio of distances. R1 or R2 as calculated. The color temperature converting portion 350 converts the chroma of the inputted image data into color temperature $T_o$. Then the image data with the converted color temperature is displayed on the display portion 360.

Although the X coordinates of the CIE XYZ coordinates are used in the preferred embodiment of the present invention, for the X coordinates clearly show the relation between the chroma coordinates and the color temperature, other coordinates may also be used.

In the apparatus and method for calculating color temperature of the color display system in accordance with the present invention, since the color temperature is calculated at a one-dimensional level, the apparatus and method can be easily established at a hardware level. Further, since color temperature can be obtained reliably by using a small amount of hardware, the apparatus and method satisfy the demands of the viewers for various colors. As a result, practicality, utilization, and distensibility are improved.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. An apparatus for calculating a color temperature, comprising:
   a color temperature selecting portion for selecting a left color temperature and a right color temperature that are most adjacent to a one-dimensional chroma inputted from a mapping table, the table mapping a chroma to a color temperature;
   a distance calculating portion for calculating distances between the selected left color temperature and the inputted one-dimensional chroma, and between the selected right color temperature and the inputted one-dimensional chroma, respectively; and
   a color temperature calculating portion for calculating a color temperature corresponding to the one-dimensional chroma inputted in accordance with a ratio of the calculated distances.

2. The apparatus for calculating the color temperature of claim 1, wherein the one-dimensional chroma is one coordinate of CIE XYZ coordinates.

3. An apparatus for calculating a color temperature, comprising:
   a chroma selecting portion for selecting a left and a right chroma that are most adjacent to a one-dimensional chroma inputted from a mapping table, the table mapping a chroma to a color temperature;
   a distance calculating portion for calculating distances between the selected left chroma and the inputted one-dimensional chroma, and between the selected right chroma and the inputted one-dimensional chroma, respectively; and
   a color temperature calculating portion for calculating a color temperature corresponding to the one-dimensional chroma inputted in accordance with a ratio of the calculated distances.

4. A color display system, comprising:
   a table mapping a chroma to a color temperature;
   a chroma detecting portion for detecting the chroma from inputted image data and outputting the detected chroma at a one-dimensional level;
   a color temperature selecting portion for selecting from the table left and right color temperature/chroma that are most adjacent to the one-dimensional chroma;
   a distance calculating portion for calculating distances between the selected left color temperature/chroma and the one-dimensional chroma, and between the selected right color temperature/chroma and the one-dimensional chroma;
   a color temperature calculating portion for calculating a color temperature corresponding to the one-dimensional chroma in accordance with a ratio of the calculated distances;
   a color temperature converting portion for converting the chroma of the inputted image data into the calculated color temperature; and
   a display portion for displaying an image having the converted color temperature.

5. A method for calculating a color temperature, comprising the steps of:
   a) inputting one-dimensional chroma;
   b) selecting left and right color temperatures that are most adjacent to the one-dimensional chroma inputted from a chroma-color temperature mapping table;
   c) calculating distances between the selected left color temperature and the inputted one-dimensional chroma, and between the selected right color temperature and the inputted one-dimensional chroma; and
   d) calculating a color temperature corresponding to the one-dimensional chroma inputted in accordance with a ratio of the calculated distances.

6. The method for calculating the color temperature of claim 5, wherein the step d) comprises the sub-steps of:
   d1) calculating a rate-of-change of the color temperature from the left and right color temperatures selected in accordance with the ratio of the calculated distances to the inputted one-dimensional chroma; and
   d2) calculating a final output color temperature corresponding to the inputted one-dimensional chroma by adding/subtracting the calculated rate-of-change of the temperature to/from the selected left and right color temperature.

* * * * *